(12) United States Patent
Nakamura

(10) Patent No.: US 8,112,721 B2
(45) Date of Patent: Feb. 7, 2012

(54) IMAGE REPRODUCTION DEVICE AND METHOD THEREOF

(75) Inventor: Satoshi Nakamura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1024 days.

(21) Appl. No.: 11/987,370

(22) Filed: Nov. 29, 2007

(65) Prior Publication Data

US 2008/0134096 A1 Jun. 5, 2008

(30) Foreign Application Priority Data

Dec. 1, 2006 (JP) ................................. 2006-326067

(51) Int. Cl.
*G06F 3/048* (2006.01)
(52) U.S. Cl. ........................................ 715/838
(58) Field of Classification Search .................... 715/838
See application file for complete search history.

(56) References Cited

U.S. PATENT DOCUMENTS

| | | | | |
|---|---|---|---|---|
| 6,408,301 | B1 * | 6/2002 | Patton et al. .................. | 707/741 |
| 6,623,428 | B2 * | 9/2003 | Miller et al. .................. | 600/300 |
| 7,006,952 | B1 * | 2/2006 | Matsumoto et al. ............. | 703/2 |
| 2005/0147309 | A1 * | 7/2005 | Katata et al. .................. | 382/239 |
| 2006/0192776 | A1 | 8/2006 | Nomura et al. | |
| 2007/0171277 | A1 | 7/2007 | Shioi et al. | |

FOREIGN PATENT DOCUMENTS

| | | |
|---|---|---|
| JP | 2004-63998 A | 6/2004 |
| JP | 2004-163998 A | 6/2004 |
| JP | 2004-349731 A | 12/2004 |
| JP | 2004-349732 A | 12/2004 |

OTHER PUBLICATIONS

Japanese Office Action, issued Oct. 19, 2009, for Application No. 2006-326067.
Japanese Office Action, issued Oct. 19, 2009, for Application No. 2006-326067.

* cited by examiner

*Primary Examiner* — William Bashore
*Assistant Examiner* — Henry Orr
(74) *Attorney, Agent, or Firm* — Birch, Stewart, Kolasch & Birch, LLP

(57) ABSTRACT

An image reproduction device comprises: a thumbnail image read device which reads a thumbnail image file having recorded thereon two or more types of thumbnail images produced based on a stereo image composed of a plurality of images obtained by capturing the identical subject from a plurality of viewpoints; a thumbnail image selection device which selects one thumbnail image to be used for displaying from among the plurality of thumbnail images recorded on the read thumbnail image file; and a thumbnail image reproduction device which causes the selected thumbnail image to be displayed on a display device. Thereby, the device enables to reproduce in a short length of time, an optimum one of different thumbnail images of plural types, or a thumbnail image of a type desired by a user.

22 Claims, 13 Drawing Sheets

INTEGRATED IMAGE (FOUR VIEWPOINTS)

LEFT IMAGE (TWO VIEWPOINTS)

RIGHT IMAGE (WITH SYMBOL R)

IMAGE WITH DEPTH MAP

FIG.13A

| HEADER | FIRST THUMBNAIL | THUMBNAIL MANAGEMENT INFORMATION | SECOND THUMBNAIL | ... | K-TH THUMBNAIL | 3D IMAGE |

FIG.13B

| HEADER | FIRST THUMBNAIL | 3D IMAGE | THUMBNAIL MANAGEMENT INFORMATION | SECOND THUMBNAIL | ... | K-TH THUMBNAIL |

FIG.13C

| HEADER | FIRST THUMBNAIL | 3D IMAGE (IMAGE OF VIEWPOINT 1) | THUMBNAIL MANAGEMENT INFORMATION | SECOND THUMBNAIL | ... | K-TH THUMBNAIL | 3D IMAGE (IMAGE OF VIEWPOINT 2) | ... | 3D IMAGE (IMAGE OF VIEWPOINT K) |

IMAGE REPRODUCTION DEVICE AND METHOD THEREOF

BACKGROUND OF THE INVENTION

1. Field of the Invention

The present invention relates to an image reproduction device and method thereof, and more particularly to a technique of reproducing thumbnail images of a stereo image (hereinafter referred to as a "3D image") composed of plural images obtained by capturing the identical subject from plural viewpoints.

2. Description of the Related Art

There has hitherto been proposed an image data production device which produces an image file having recorded thereon a 3D image being image information corresponding to plural viewpoints, its thumbnail image, and three-dimensional control information for displaying as the 3D image (Japanese Patent Application Laid-Open No. 2004-349731).

In Japanese Patent Application Laid-Open No. 2004-349731, as the thumbnail image corresponding to the 3D image, there is described the following plural types of thumbnail images and the like.

(1) Images obtained by directly scaling down and arranging 3D images of all viewpoints
(2) Image obtained by extracting and scaling down a 3D image of one viewpoint
(3) Image embedded with a symbol indicating that the image is three-dimensional There has also been proposed an image file production device which produces a stereo image file (3D image file) having recorded thereon a 3D image and a thumbnail image file having recorded thereon a two-dimensional image (hereinafter referred to as a "2D image") as the thumbnail image of the 3D image (Japanese Patent Application Laid-Open No. 2004-349732). The 3D image file and the thumbnail image file corresponding to the 3D image are named under the naming rule based on DCF (Design rule for Camera File system: unified recording format for digital camera), but these two image files are named so as to have the same file name and different extensions, so that these are associated with each other.

In Japanese Patent Application Laid-Open No. 2004-349731, as the thumbnail image corresponding to a 3D image, there is described an example of plural types of thumbnail images, but only one thumbnail image is recorded in one image file. Thus, even in an image reproduction device for 3D image capable of reproducing various types of thumbnail images, one fixed thumbnail image preliminarily recorded on the image file is all that can be displayed; for example, when different types of thumbnail images are recommended by each device, there is a problem that displaying of thumbnail images recommended by each device or displaying of the thumbnail image of a type preliminarily set by the user cannot be performed.

In Japanese Patent Application Laid-Open No. 2004-349732, there is no description of the type of thumbnail image corresponding to 3D image. Consequently, when an image reproduction device for reproducing a 3D image reproduces a thumbnail image based on a thumbnail image file having recorded thereon a 2D thumbnail image, one fixed thumbnail image preliminarily recorded on the thumbnail image file is all that can be displayed. Thus, the problem similar to that with the invention described in Japanese Patent Application Laid-Open No. 2004-349731 arises.

The present invention addresses this problem, with the object of providing an image reproduction device and method thereof which can reproduce in a short length of time, an optimum one of different thumbnail images of plural types produced as the thumbnail image of a 3D image, or a thumbnail image of a type desired by a user.

SUMMARY OF THE INVENTION

To achieve the above object, an image reproduction device according to a first aspect of the present invention includes: a thumbnail image read device which reads a thumbnail image file having recorded thereon two or more types of thumbnail images produced based on a stereo image composed of a plurality of images obtained by capturing the identical subject from a plurality of viewpoints; a thumbnail image selection device which selects one thumbnail image to be used for displaying from among the plurality of thumbnail images recorded on the read thumbnail image file; and a thumbnail image reproduction device which causes the selected thumbnail image to be displayed on a display device.

That is, a desired thumbnail image is selected and displayed from the thumbnail image file having preliminarily recorded thereon two or more types of thumbnail images, so a thumbnail image of a type set by the device, or a desired thumbnail image appropriately set by the user can be reproduced in a short length of time.

A thumbnail image can be produced based on the original image (stereo image) at the time of reproduction; but in this case, it takes time to produce a thumbnail image, and particularly when many 3D image files are recorded, it takes long time to display all the thumbnail images. According to the aspect of the present invention, since a plurality of types of thumbnail images file preliminarily produced are looked up, a thumbnail image can be quickly displayed.

According to a second aspect of the present invention, the image reproduction device of the first aspect further includes a stereo image read device which reads a stereo image file having recorded thereon the stereo image and associated with the thumbnail image file, wherein when a thumbnail image is contained in the stereo image file associated with the thumbnail image file, the thumbnail image read device also reads the thumbnail image.

Accordingly, even in a reproduction device which does not look up a thumbnail image file, also, the thumbnail image of a 3D image can be quickly reproduced without producing a new thumbnail image based on the 3D image.

According to a third aspect of the present invention, in the image reproduction device of the first aspect: the thumbnail image file may contain management information including a thumbnail image identifier for identifying the type of each thumbnail image; and the thumbnail image selection device automatically selects based on the management information, a thumbnail image corresponding to a preliminarily set thumbnail image identifier. Accordingly, in the image reproduction device, the type of a thumbnail image to be reproduced can be easily selected.

An image reproduction device according to a fourth aspect of the present invention includes: a thumbnail image read device which reads a thumbnail image file having recorded thereon one or more types of thumbnail images produced based on a stereo image composed of a plurality of images obtained by capturing the identical subject from a plurality of viewpoints; a stereo image read device which reads a stereo image file associated with the thumbnail image file and having recorded thereon along with the stereo image, one thumbnail image of a type different from the thumbnail image recorded on the thumbnail image file; a thumbnail image selection device which selects one thumbnail image from among the plurality of thumbnail images recorded on the read thumbnail image file and the stereo image file; and a thumbnail image reproduction device which causes the selected thumbnail image to be displayed on a display device.

That is, a desired thumbnail image can be selected from among the plurality of types of thumbnail images recorded in a classified manner on the stereo image file and the thumbnail image file. In addition, one thumbnail image is recorded on the stereo image file, so the thumbnail image of the 3D image can be quickly reproduced even in a reproduction device which does not look up the thumbnail image file.

According to a fifth aspect of the present invention, in the image reproduction device of the fourth aspect: each of the thumbnail image file and the stereo image file may contain management information including a thumbnail image identifier for identifying the type of a thumbnail image; and the thumbnail image selection device automatically selects based on the management information, a thumbnail image corresponding to a preliminarily set thumbnail image identifier.

An image reproduction device according to a sixth aspect of the present invention includes: an image read device which reads a stereo image file having recorded thereon a stereo image composed of a plurality of images obtained by capturing the identical subject from a plurality of viewpoints, and two or more types of thumbnail images produced based on the stereo image; a thumbnail image selection device which selects one thumbnail image to be used for displaying from among the plurality of thumbnail images recorded on the read stereo image file; and a thumbnail image reproduction device which causes the selected thumbnail image to be displayed on a display device.

According to the sixth aspect of the present invention, since a desired thumbnail image is selected and displayed from the stereo image file having preliminarily recorded thereon two or more types of thumbnail images, the thumbnail image of a type set by the device, or a desired thumbnail image appropriately set by the user can be reproduced in a short length of time. In addition, even in the reproduction device which does not look up a thumbnail image file, the thumbnail image of the 3D image can be quickly reproduced without producing a new thumbnail image based on the 3D image.

According to a seventh aspect of the present invention, in provided the image reproduction device of the sixth aspect: the stereo image file contains management information including a thumbnail image identifier for identifying the type of a thumbnail image; and the thumbnail image selection device automatically selects based on the management information, a thumbnail image corresponding to a preliminarily set thumbnail image identifier.

According to an eighth aspect of the present invention, there is provided the image reproduction device of any one of the second, fourth, fifth, sixth and seventh aspects further includes: an instruction device which gives an instruction of reproducing a stereo image corresponding to the thumbnail image displayed on the display device; and a stereo image display device which reads in response to inputting of the instruction from the instruction device, the stereo image instructed to be reproduced from the stereo image file and causes the stereo image to be displayed on the display device.

An image reproduction method according to a ninth aspect of the present invention includes the steps of: reading a thumbnail image file having sequentially recorded thereon two or more types of thumbnail images produced based on a stereo image composed of a plurality of images obtained by capturing the identical subject from a plurality of viewpoints; selecting one thumbnail image to be used for displaying from among the plurality of thumbnail images recorded on the read thumbnail image file; and causing the selected thumbnail image to be displayed on a display device.

According to a tenth aspect of the present invention, the image reproduction method of the ninth aspect further includes the step of reading a stereo image file having recorded thereon the stereo image and associated with the thumbnail image file, wherein the thumbnail image selection step selects one thumbnail image to be used for displaying from among the plurality of thumbnail images recorded on the read thumbnail image file and the stereo image file.

An image reproduction method according to an eleventh aspect of the present invention includes the steps of: reading a thumbnail image file having recorded thereon one or more types of thumbnail images produced based on a stereo image composed of a plurality of images obtained by capturing the identical subject from a plurality of viewpoints; reading a stereo image file associated with the thumbnail image file and having recorded thereon along with the stereo image, one thumbnail image of a type different from the thumbnail images recorded on the thumbnail image file; selecting one thumbnail image to be used for displaying from among the plurality of thumbnail images recorded on the read thumbnail image file and the stereo image file; and causing the selected thumbnail image to be displayed on a display device.

An image reproduction method according to a twelfth aspect of the present invention includes the steps of: reading a stereo image file having recorded thereon a stereo image composed of a plurality of images obtained by capturing the identical subject from a plurality of viewpoints, and two or more types of thumbnail images produced based on the stereo image; selecting one thumbnail image to be used for displaying from among the plurality of thumbnail images recorded on the read stereo image file; and causing the selected thumbnail image to be displayed on a display device.

According to aspects of the present invention, since a thumbnail image of a type set by the device is selected and displayed from among plural different-type thumbnail images preliminarily produced as the thumbnail image of a 3D image and recorded on the image file, an optimum thumbnail image or a thumbnail image of a type desired by the user can be reproduced in a short length of time.

BRIEF DESCRIPTION OF THE DRAWINGS

FIGS. 13A, 13B and 13C are each a view illustrating a file structure according to another embodiment of 3D image file.

DETAILED DESCRIPTION OF THE PREFERRED EMBODIMENTS

The present invention will be described below with reference to the accompanying drawings showing preferred embodiments thereof.

[Schematic Configuration of Digital Camera]

Figure 1:
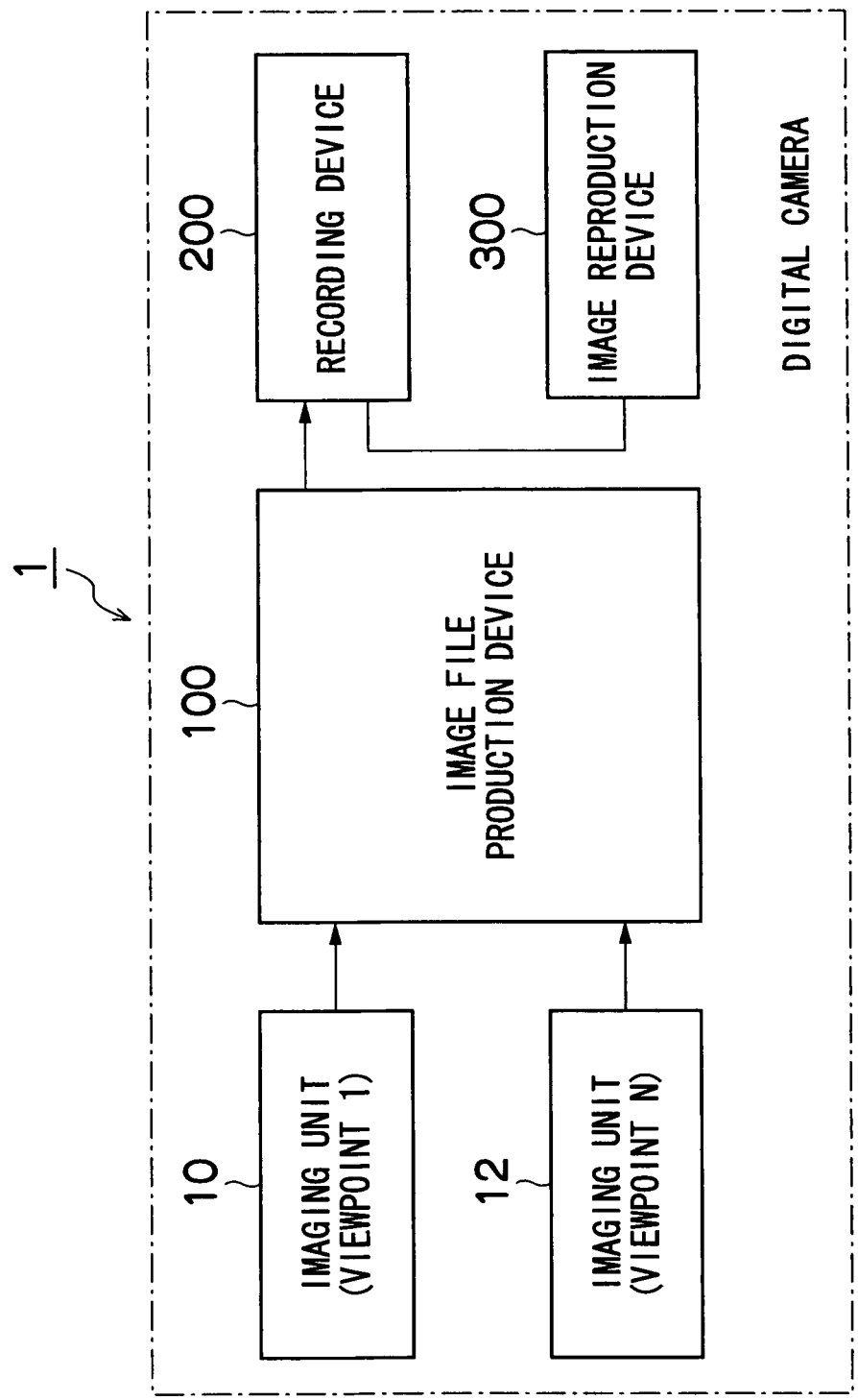
FIG. 1 is a block diagram illustrating a schematic configuration of an imaging device (digital camera) with an image reproduction device according to the present invention.

FIG. 1 is a block diagram illustrating a schematic configuration of an imaging device with an image reproduction device according to the present invention.

The imaging device (digital camera) 1 includes imaging units 10 and 12 which capture the identical subject from plural viewpoints (viewpoint 1 and viewpoint N (N being 2 or more)) to capture a 3D image, an image file production device 100 which retrieves plural images captured by the imaging units 10 and 12, a recording device 200 which records a 3D image file and a thumbnail image file produced by the image file production device 100 onto an external recording medium such as a memory card, or a recording medium incorporated in the camera, and an image reproduction device 300 which reads the 3D image file and thumbnail image file recorded on the recording medium and reproduces a 3D image and thumbnail image.

[Image File Production Device]

Figure 2:
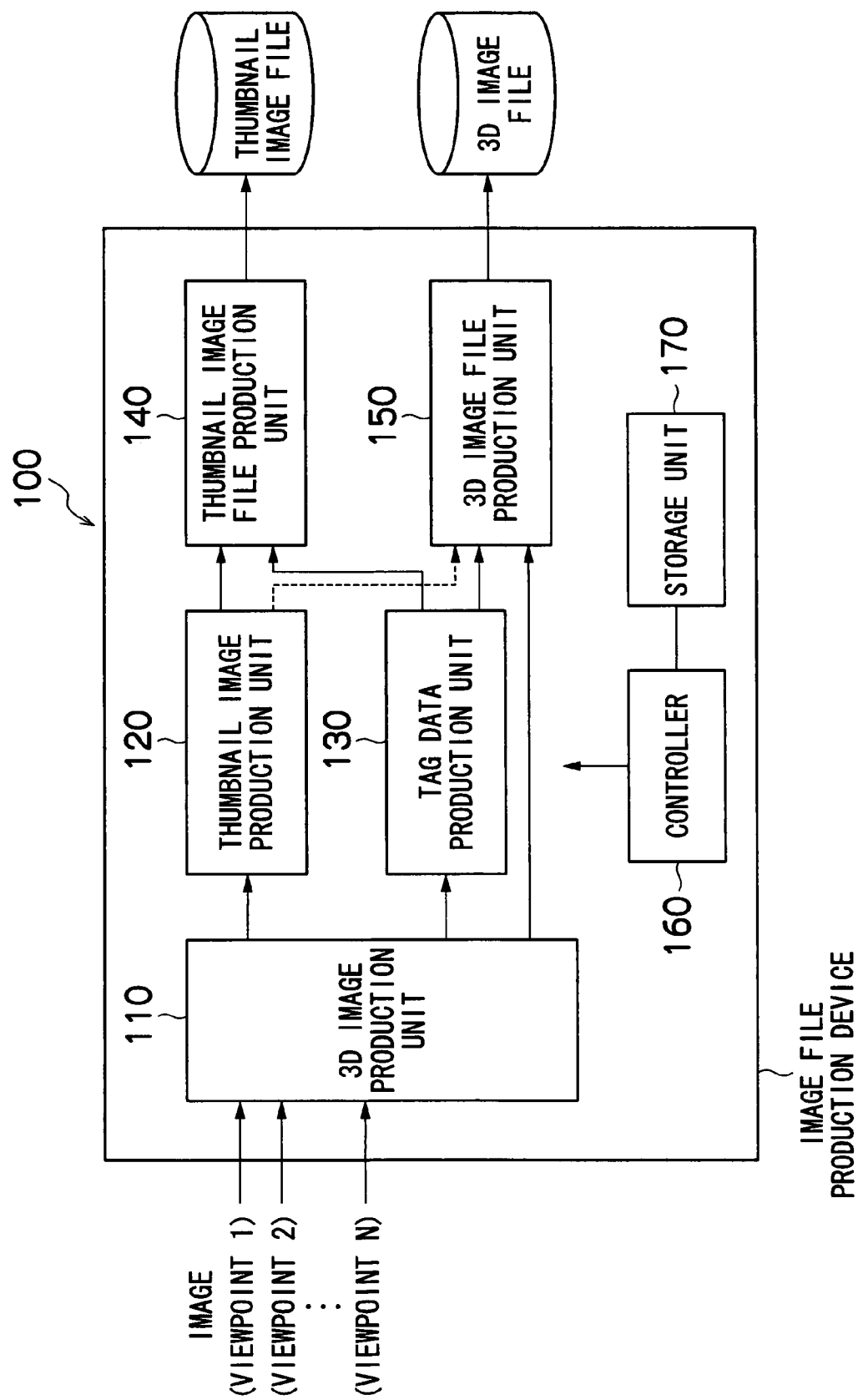
FIG. 2 is a block diagram illustrating an internal configuration of an image file production device arranged in the digital camera.

FIG. 2 is a block diagram illustrating an internal configuration of an image file production device 100.

The image file production device 100 mainly includes a 3D image production unit 110, a thumbnail image production unit 120, a tag data production unit 130, a thumbnail image file production unit 140, a 3D image file production unit 150, a controller 160 and a storage unit 170.

The controller 160 controls each unit in an integrated manner according to a prescribed program. Stored in the storage unit 170 are the program executed by the controller 160, setting data of each unit, and the like.

The 3D image production unit 110 is input with plural images captured by the imaging units 10 and 12 arranged in plural viewpoint positions, and according to the present embodiment, produces a 3D image composed of plural images integrated as one image.

When no integrated 3D image is produced, the 3D image production unit 110 may be omitted. In addition to the plural images obtained by capturing the identical subject from plural viewpoints, the plural images input to the 3D image production unit 110 include a range image indicating imaging distances determined for each pixel of an image representing the subject. Alternatively, the 3D image production unit 110 may produce a range image based on plural images obtained by capturing the identical subject from plural viewpoints.

The thumbnail image production unit 120 produces thumbnail images of plural types corresponding to a 3D image based on the integrated image produced by the 3D image production unit 110 or on prior-to-integration images of plural viewpoints.

FIGS. 3A to 3D illustrate an example of plural types of thumbnail images produced by the thumbnail image production unit 120.

Figure 3A:
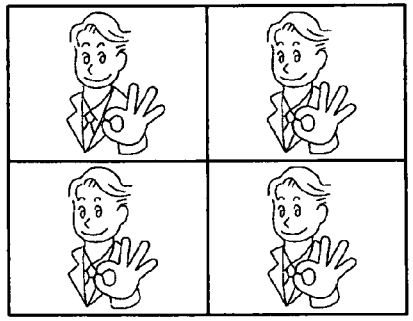
FIGS. 3A to 3D are views illustrating examples of plural types of thumbnail images produced by a thumbnail image production unit.

FIG. 3A illustrates a thumbnail image produced by scaling down an integrated image (3D image) of four viewpoints in a case where they are produced by the 3D image production unit 110 to which images of four viewpoints are input.

Figure 3B:

FIG. 3B illustrates a thumbnail image produced by scaling down only a left image (or right image) when the right and left images of two viewpoints are input.

Figure 3C:

FIG. 3C illustrates a thumbnail image with a symbol mark (R) indicating the right image, produced by scaling down only a right image (or left image) when the right and left images of two viewpoints are input.

Figure 3D:
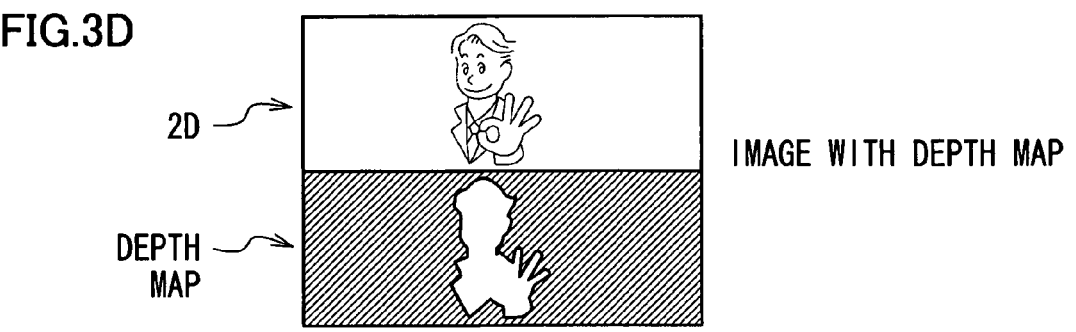

FIG. 3D illustrates a thumbnail image produced by integrating a scaled-down 2D image with a scaled-down range image when the 2D image and the range image corresponding to the 2D image are input. In this case, the range image is an image in which as the distance is closer, a higher pixel value is allotted.

The tag data production unit 130 produces tag data of a thumbnail image file and 3D image file, and outputs the respective tag data to the thumbnail image file production unit 140 and 3D image file production unit 150. In the thumbnail image file described later, plural types of thumbnail images are recorded in combination; thus, the tag data production unit 130 also produces management information for managing plural thumbnail images, so tag data produced by the tag data production unit 130 are different from those of conventional image files.

The thumbnail image file production unit 140 produces a thumbnail image file based on the plural types of thumbnail images produced by the thumbnail image production unit 120 and the tag data for thumbnail image file produced by the tag data production unit 130.

Figure 4:
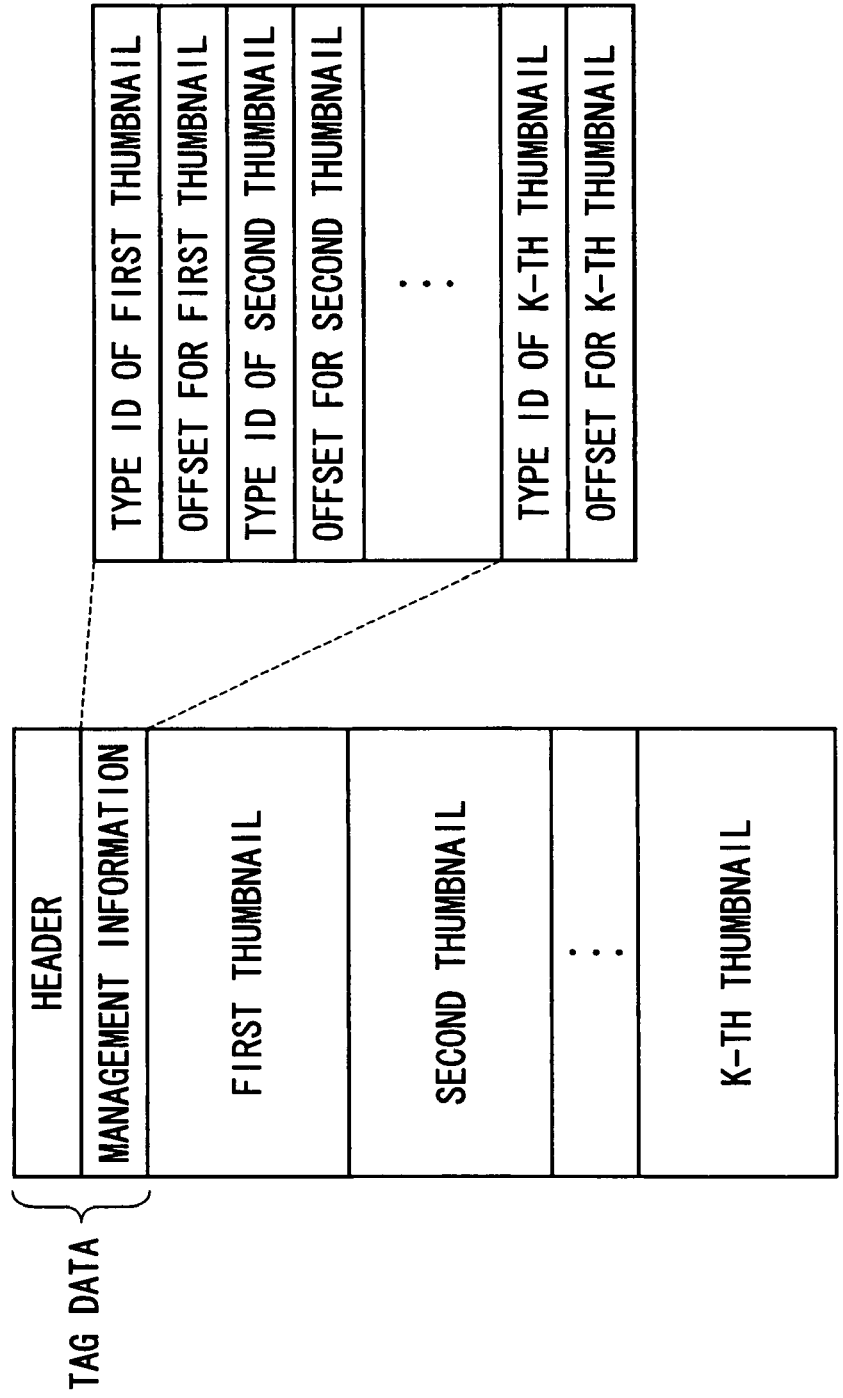
FIG. 4 is a view illustrating an exemplary file structure of a thumbnail image file.

FIG. 4 illustrates an exemplary file structure of the thumbnail image file produced by the thumbnail image file production unit 140.

As illustrated in FIG. 4, in the thumbnail image file, the management information on plural types of thumbnail images is recorded immediately subsequent to a header, and plural thumbnail images (first, second, . . . , k-th) are sequentially recorded subsequent to the management information.

Here, the management information includes, as illustrated in FIG. 4, "thumbnail image identifier" (type ID) for identifying the type of each thumbnail image and "offset" indicating the position (address) in the file on which the thumbnail image corresponding to type ID is recorded.

In this case, since the management information is recorded immediately subsequent to the header, it is possible to select a thumbnail image to be reproduced before reading the thumbnail image, and thus it is possible to read only the thumbnail image to be reproduced.

Meanwhile, the 3D image file production unit 150 produces a 3D image file based on the integrated image (3D image) produced by the 3D image production unit 110 and tag data for 3D image file produced by the tag data production unit 130.

FIGS. 5A to 5D illustrate an exemplary file structure of the 3D image file produced by the 3D image file production unit 150.

Figure 5A:
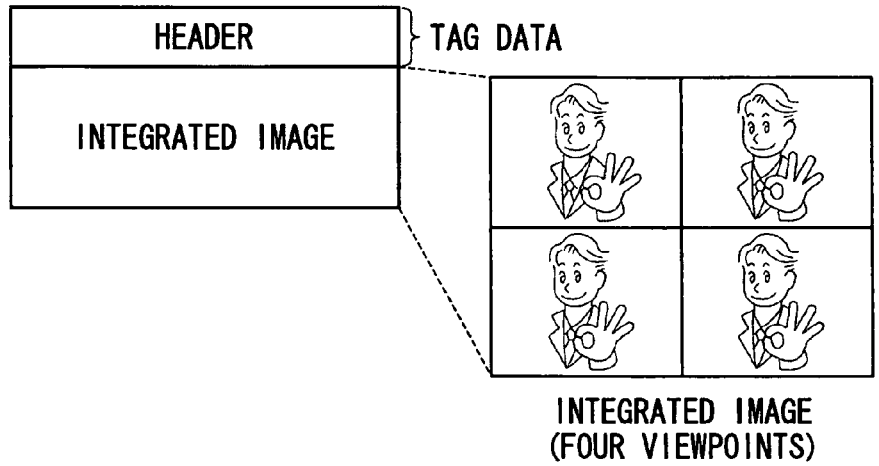
FIGS. 5A to 5D are views illustrating an exemplary file structure of a 3D image file.

The 3D image file illustrated in FIG. 5A has a file structure in which one integrated image (3D image) is recorded subsequent to the header on which tag data are recorded. The tag data include information indicating the areas of images of four viewpoints and information (length of baseline, angle of convergence and the like) on the position of viewpoints of each image; these pieces of information are used during reproduction in the 3D image reproduction device.

Figure 5B:
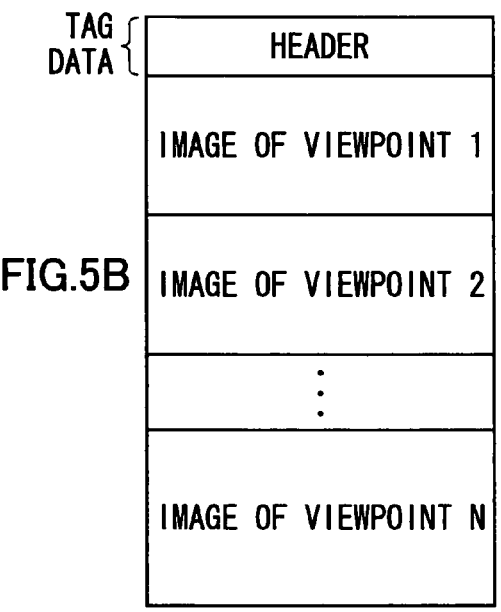

The 3D image file illustrated in FIG. 5B has a file structure in which plural images (3D image) captured from plural viewpoints are recorded being combined in each frame one by one subsequent to the header on which tag data are recorded. The tag data include information indicating the areas of plural images and information (length of baseline, angle of convergence and the like) on the position of viewpoints of each image; these pieces of information are used during reproduction in the 3D image reproduction device.

Figure 5C:
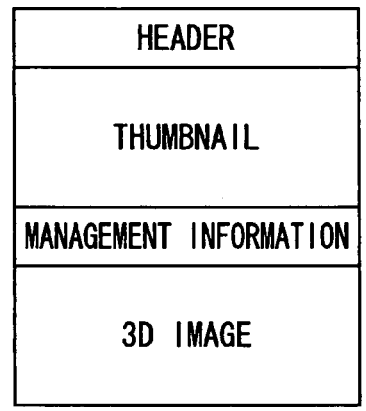

The 3D image file illustrated in FIG. 5C has a file structure in which a thumbnail image is recorded subsequent to the header on which tag data are recorded, and management information of the thumbnail image is recorded subsequent to the thumbnail image, and a 3D image is recorded subsequent to the management information.

Figure 5D:
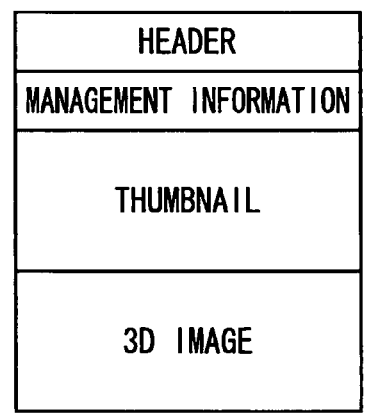

The 3D image file illustrated in FIG. 5D has a file structure in which management information is recorded subsequent to the header on which tag data are recorded, and a thumbnail image is recorded subsequent to the management information, and a 3D image is recorded subsequent to the thumbnail image.

In producing the 3D image file illustrated in FIG. 5C or 5D, the 3D image file production unit 150 is input with one of plural types of thumbnail images produced by the thumbnail image production unit 120. As the management information, a thumbnail image identifier (type ID) of thumbnail image in the 3D image file is recorded. As the 3D image to be recorded on the 3D image file illustrated in FIG. 5C or 5D, any of the 3D images illustrated in FIGS. 5A and 5B can be used.

[Recording Device]

In the recording device 200 illustrated in FIG. 1, a thumbnail image file produced by the thumbnail image file production unit 140 and a 3D image file produced by the 3D image file production unit 150 are recorded on a recording medium.

Figure 6:
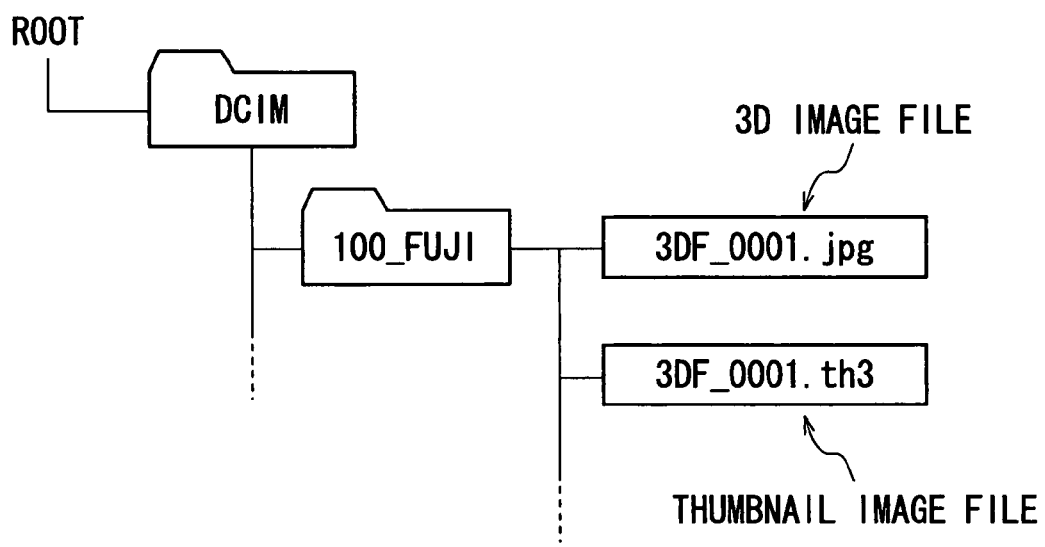
FIG. 6 is a view illustrating a directory structure of a recording medium having stored therein the 3D image file and the thumbnail image file.

FIG. 6 illustrates a directory structure of the recording medium. As illustrated in FIG. 6, a DCF folder (100-FUJI . . . ) is produced under a DCF image route directory DCIM (Digital Camera IMages), and the 3D image file and thumbnail image file are stored in the DCF folder.

Folder names and file names are automatically produced based on a prescribed naming rule and assigned to the DCF folder, 3D image file and thumbnail image file produced in this way.

In the present embodiment, folder names and file names are automatically produced based on the DCF rule. Here, the folder name of DCF folder is produced as illustrated in the following table.

TABLE 1

| RULE | FOLDER NUMBER (100-999) | FREE CHARACTER (5 CHARACTERS) |
|---|---|---|
| EXAMPLE | 100 | ABCDE |

In this case, it is recommended that, when no DCF folder is present directly under DCF image route directory DCIM, any value be allotted to the initial value of the folder number, or when a DCF folder is present, a sequence number (maximum number+1) be allotted to the folder number of the newly produced DCF folder.

The file name of image file (DCF file) is produced as illustrated in the following table.

TABLE 2

| RULE | FREE CHARACTER (4 CHARACTERS) | FILE NUMBER (0001-9999) |
|---|---|---|
| EXAMPLE | ABCD | 0001 |

In this case, it is recommended that, when no DCF file is present in the DCF folder, any value be allotted to the initial value of the file number, or when a DCF file is present, a sequence number (maximum number+1) be allotted to the file number of the newly produced DCF file.

As illustrated in FIG. 6, the 3D image file and the thumbnail image file corresponding to the 3D image file have different extensions (the extension of the 3D image file being jpg, the extension of thumbnail image file being th3) but a shared file name; thus the two files are associated with each other.

Figure 7:
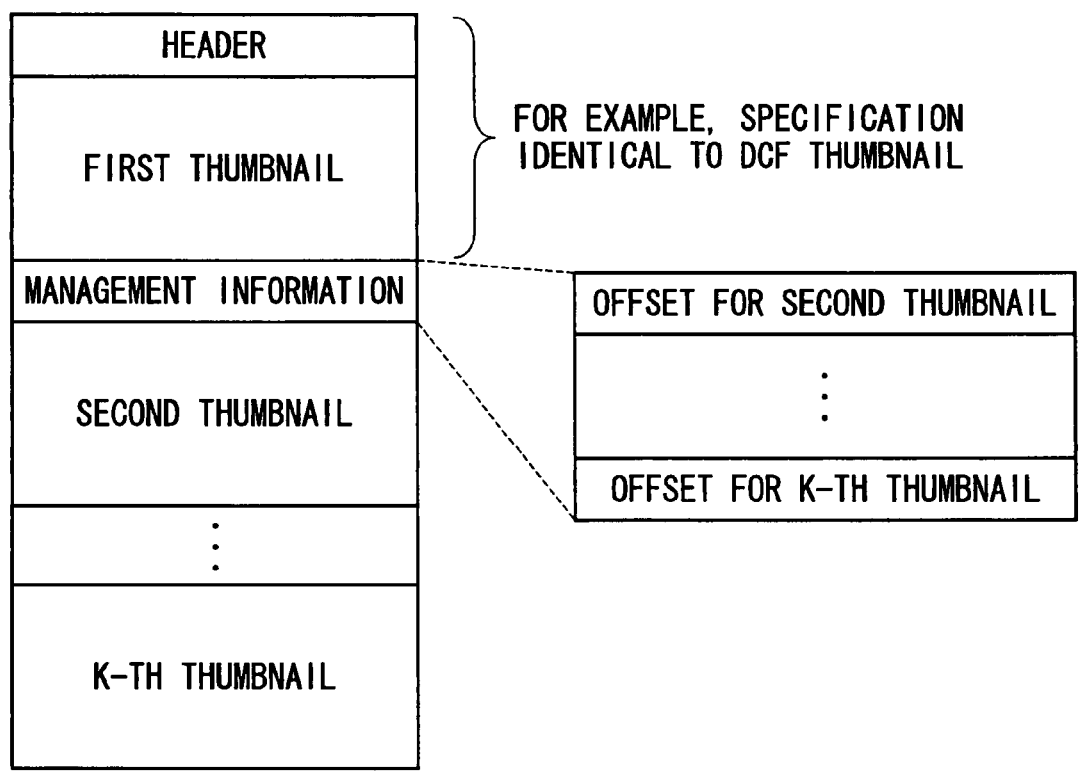
FIG. 7 is a view illustrating a file structure of a thumbnail image file according to another embodiment.

FIG. 7 is a view illustrating a file structure of a thumbnail image file according to another embodiment produced by the thumbnail image file production unit 140 illustrated in FIG. 2.

As illustrated in FIG. 7, in this thumbnail image file, one (first thumbnail image) of plural types of thumbnail images is recorded immediately subsequent to a header, and management information is recorded immediately subsequent to the first thumbnail image, and thumbnail images (second thumbnail image, . . . , k-th thumbnail image) other than the first thumbnail image are recorded immediately subsequent to the management information.

In the management information, "offset" of the second and subsequent thumbnail images and "thumbnail image identifier" (type ID) of the first to the k-th thumbnail images are recorded.

According to the thumbnail image file of the above file structure, even in an image reproduction device which cannot look up the management information, since the file structure from the header till the first thumbnail image is under a specification identical to that of DCF-rule thumbnail images file, at least the first thumbnail image can be reproduced.

Figure 8:
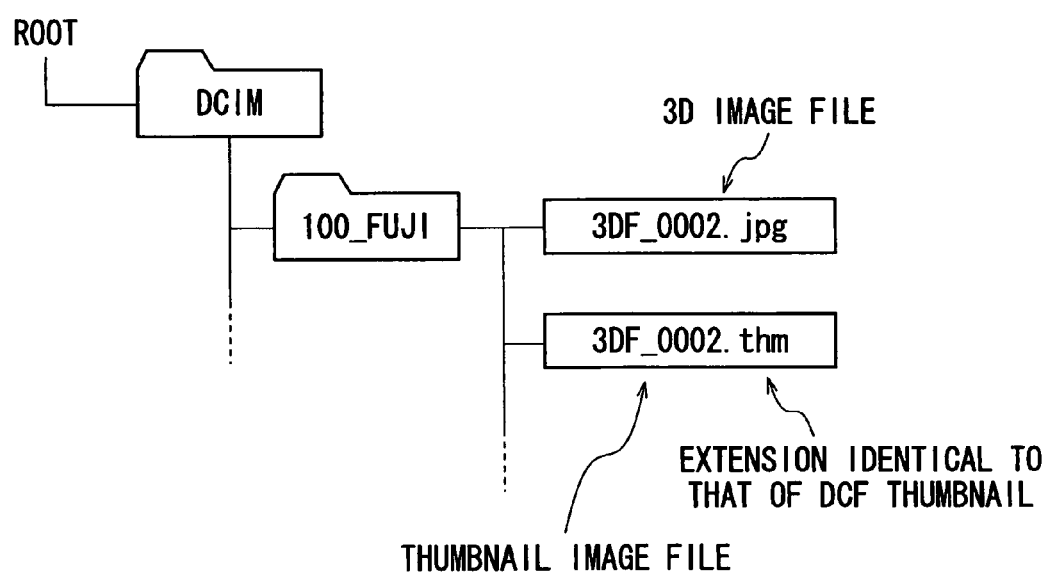
FIG. 8 is a view illustrating a directory structure of a recording medium having stored therein the 3D image file and the thumbnail image file.

Also, as the extension of the thumbnail image file, thm (the same as the DCF thumbnail image file) is used as illustrated in FIG. 8. Accordingly, compatibility with the conventional DCF thumbnail image file can be ensured.

[Image Reproduction Device]

Details of the image reproduction device 300 illustrated in FIG. 1 will be described.

Figure 9:
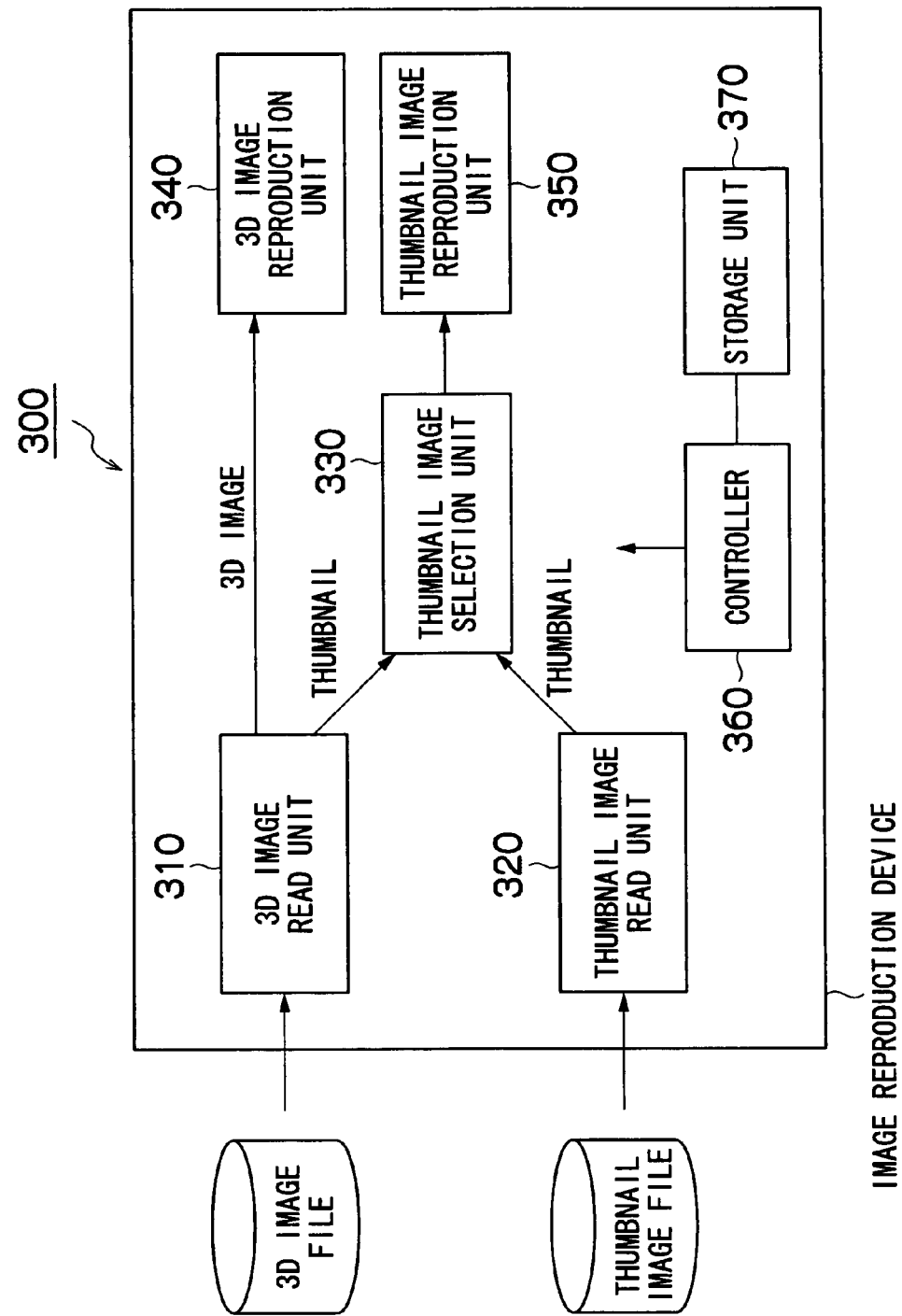
FIG. 9 is a block diagram illustrating an internal configuration of an image production device arranged in a digital camera.

FIG. 9 is a block diagram illustrating an internal configuration of the image production device 300.

The image reproduction device 300 mainly includes a 3D image read unit 310, a thumbnail image file read unit 320, a thumbnail image selection unit 330, a 3D image reproduction unit 340, a thumbnail image reproduction unit 350, a controller 360 and a storage unit 370.

The controller 360 controls each unit in an integrated manner according to a prescribed program. Stored in the storage unit 370 are the program executed by the controller 360, setting data of each unit, and the like.

The 3D image read unit 310 and the thumbnail image file read unit 320 can read a 3D image file and a thumbnail image file from the recording device 200, respectively.

The thumbnail image selection unit 330 selects a thumbnail image of a type preliminarily set on the device from among plural types of thumbnail images, and outputs the selected thumbnail image to the thumbnail image reproduction unit 350.

The thumbnail image reproduction unit 350 causes the thumbnail image input via the thumbnail image selection unit 330 to be displayed on a display unit, such as a liquid crystal monitor arranged in the digital camera 1, or on an external display unit for 3D image connected to the digital camera 1.

When the user selects a desired thumbnail image (a 3D image to be reproduced) from among the thumbnail images (for example, an index image composed of plural thumbnail images) displayed on the display unit, the 3D image reproduction unit 340 displays the 3D image input via the 3D image read unit 310 on the display unit.

The 3D image reproduction unit 340 produces a 3D image which can be recognized as a 3D image when special eyeglasses are worn and displays the image on the display unit, or when the display unit can reproduce a 3D image without using special eyeglasses (for example, a directional display), produces a 3D image corresponding to the display unit and displays the image on the display unit.

[Procedure of Image Reproduction]

When the digital camera 1 illustrated in FIG. 1 is switched to reproduction mode, 3D image reproduction becomes possible.

Figure 10:
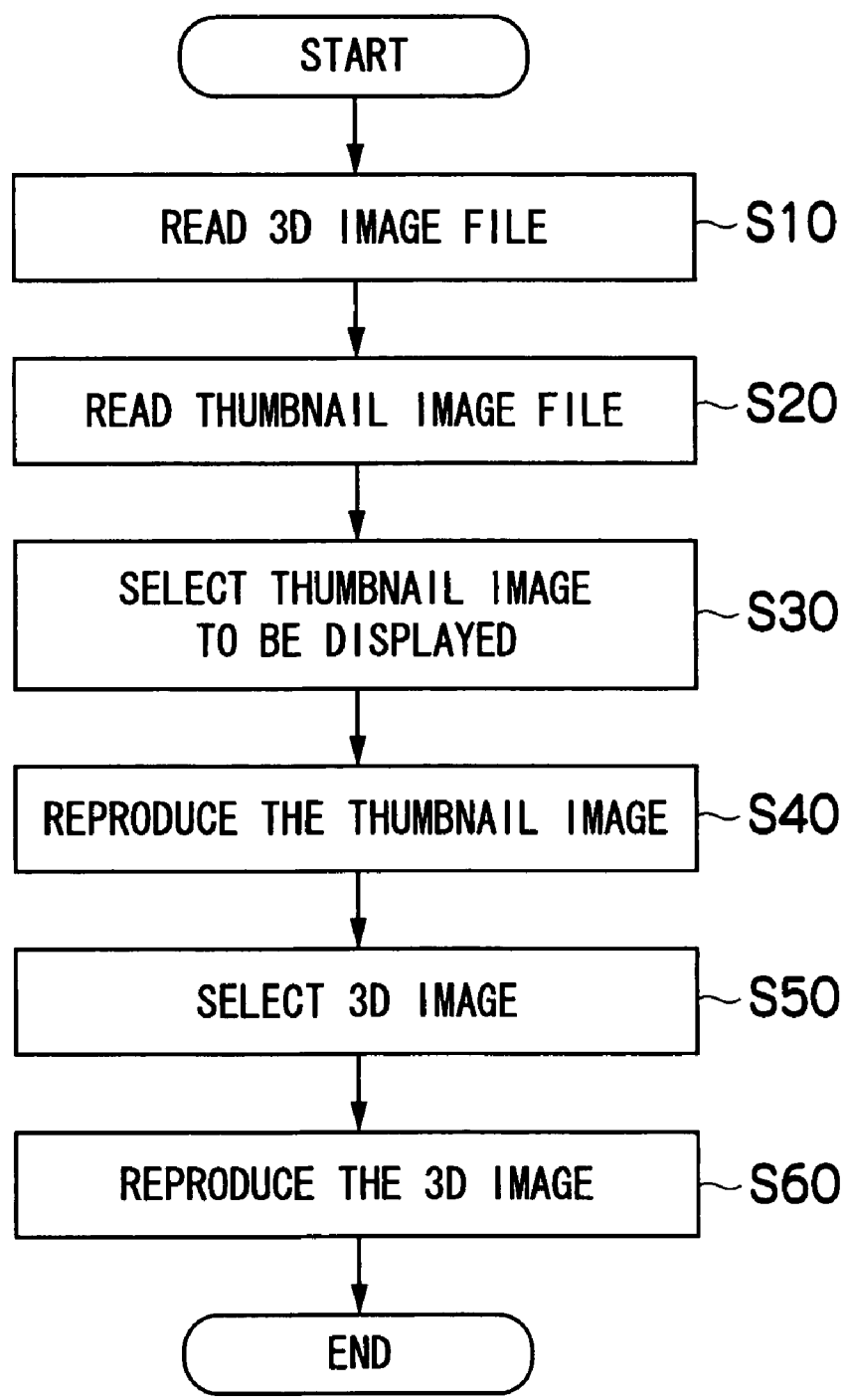
FIG. 10 is a flowchart illustrating an embodiment of the image reproduction operation in reproduction mode.
Figure 11:
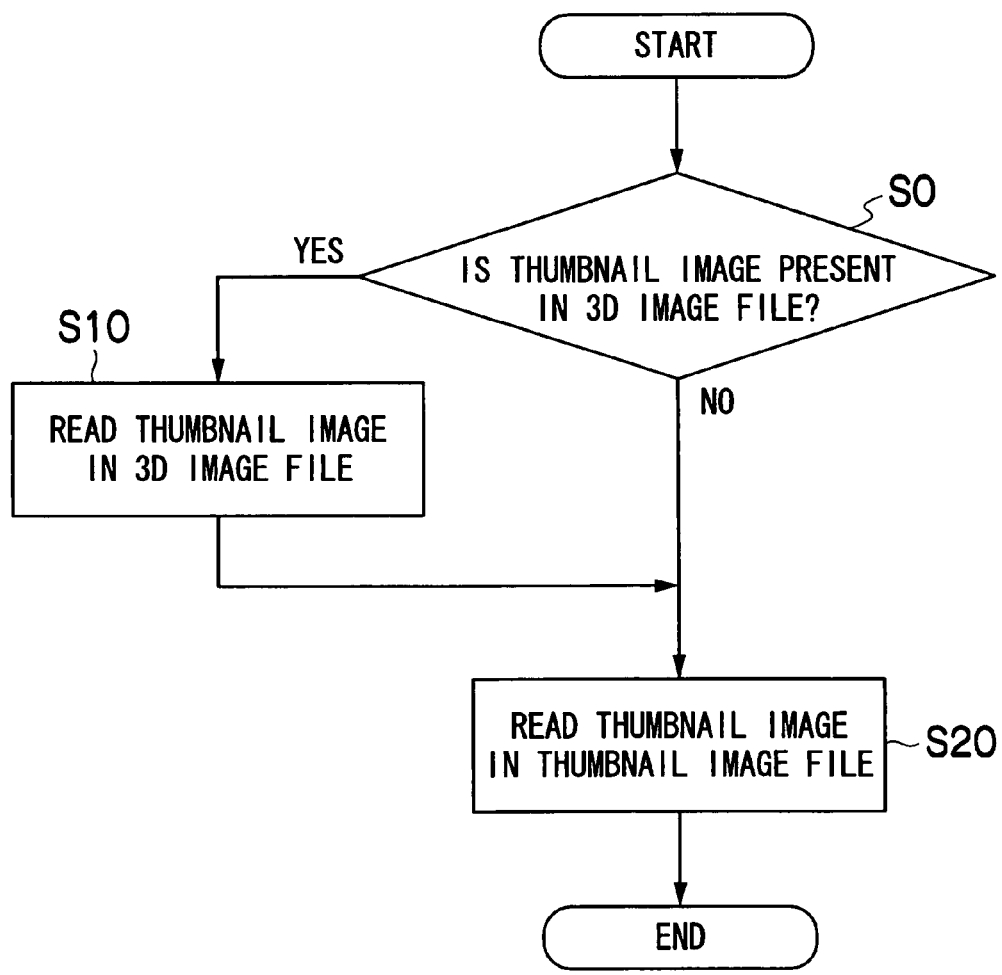
FIG. 11 is a flowchart illustrating details of the thumbnail image file read procedure in the flowchart illustrated in FIG. 10.

FIGS. 10 and 11 are flowcharts illustrating the image reproduction operation in reproduction mode.

As illustrated in FIG. 10, firstly a 3D image file is read from the recording medium (step S10) and subsequently a thumbnail image file is read (step S20).

Here, since there is a case (FIG. 5A or 5B) where no thumbnail image lies in the 3D image file, it is as illustrated in FIG. 11, it is determined whether a thumbnail image lies in the 3D image file or not (step S0), and if so, the operation proceeds to step S10; if not, step S10 is skipped and the operation proceeds to step S20.

Subsequently, a thumbnail image to be displayed is selected from among the read thumbnail images (step S30). More specifically, the type ID of the thumbnail image recorded in the management information of tag data illustrated in FIG. 4 is checked against the preliminarily set thumbnail image identifier (type ID), and a thumbnail image having type ID identical to the preliminarily set type ID is selected. In this case, when the image files are read at steps S10 and S20, it is sufficient to read only the management information in the image file.

Subsequently, the thumbnail image selected at step S30 is read from the thumbnail image file (or the 3D image file) based on the offset to the thumbnail image recorded in a manner associated with type ID, and the read thumbnail image is caused to be displayed on the display unit (step S40).

Generally, the thumbnail image is displayed as an index image composed of plural thumbnail images. More specifically, one thumbnail image is selected for each image file stored in the recording medium, and the selected thumbnail images are read to produce and display an index image of thumbnail images.

Subsequently, a desired thumbnail image is selected from the index image, and when an instruction of reproducing a 3D image corresponding to that thumbnail image is given (step S50), a 3D image is read from a 3D image file associated with the thumbnail image file on which the selected thumbnail image has been recorded, and the 3D image is caused to be displayed on the display unit (step S60). When the selected thumbnail image has been recorded on the 3D image file, the original image (3D image) is read from that 3D image file to display the 3D image on the display unit.

Figure 12:
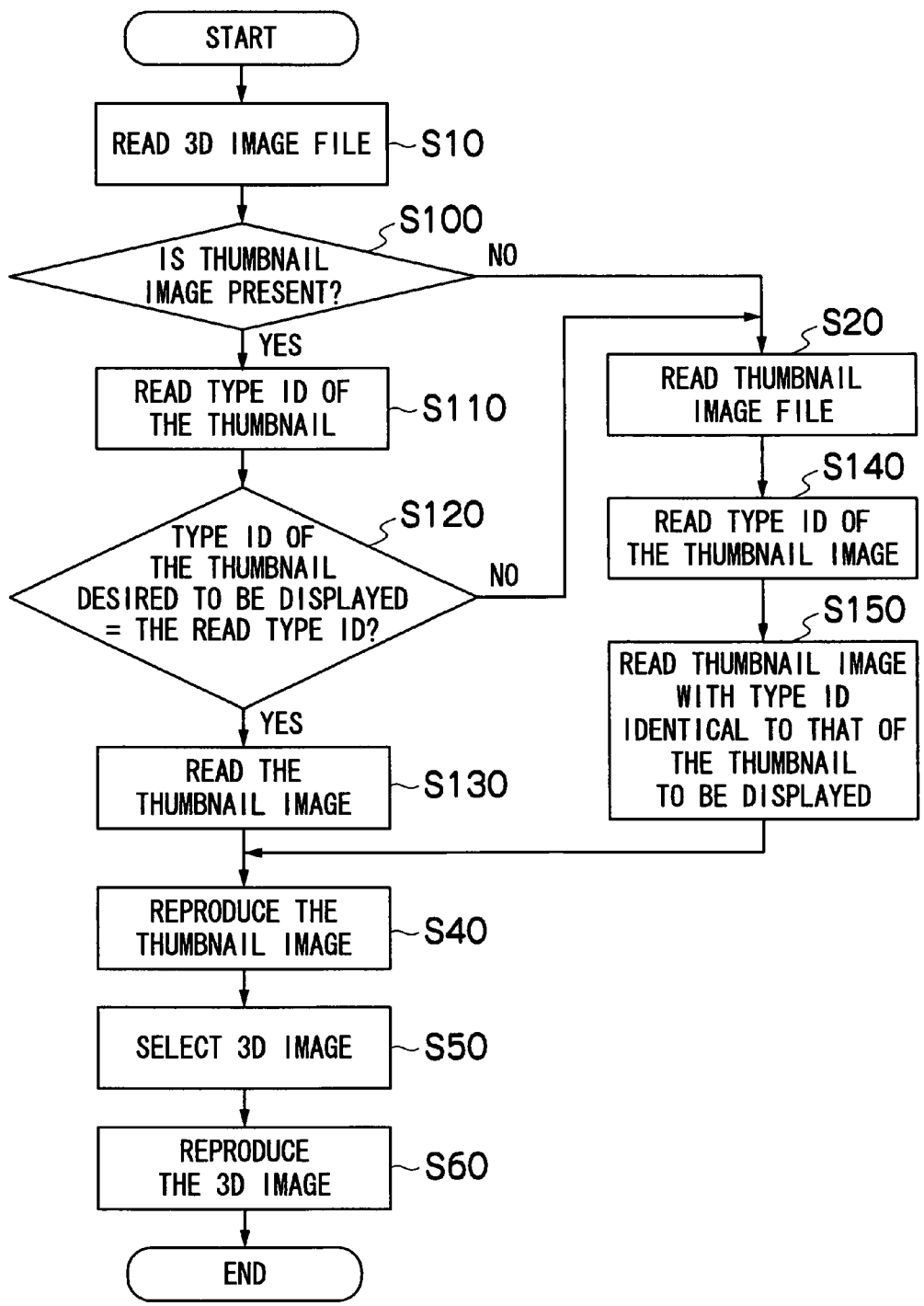
FIG. 12 is a flowchart illustrating another embodiment of the image reproduction operation in reproduction mode.

FIG. 12 is a flowchart illustrating another embodiment of the image reproduction operation in reproduction mode. In FIG. 12, the same step numbers are assigned to steps corresponding to those of the flowchart of FIG. 10, and a detailed explanation thereof is omitted.

The image reproduction operation illustrated in FIG. 12 is different from the one illustrated in FIG. 10 in that when a thumbnail image desired to be displayed has been recorded in the 3D image file, the operation of reading a thumbnail image file is omitted.

More specifically, it is determined whether or not a thumbnail image has been recorded on the 3D image file read from the recording medium (step S100).

If so, the type ID of the thumbnail image recorded in the management information (refer to FIG. 5C) is read (step S110), and it is determined whether or not this read type ID agrees with type ID of the thumbnail image desired to be displayed (step S120).

If the read type ID agrees with the type ID of the thumbnail image to be displayed, a thumbnail image recorded on the 3D image file is read (step S130), the operation proceeds to step S40. In this case, a thumbnail image file is not read.

Meanwhile, at step S100, when it is determined that no thumbnail image has been recorded on the 3D image file (FIG. 5A or 5B), or at step S120, when it is determined that the thumbnail image recorded on the 3D image file is not the thumbnail image desired to be displayed (disagreement of type ID), the operation proceeds to step S20.

At step S20, a thumbnail image file is read. Then, the type ID of the thumbnail image is read from the management information of the thumbnail image file (step S140), and a thumbnail image having type ID identical to the preliminarily set type ID is read from the thumbnail image file (step S150), and the operation proceeds to step S40.

When a thumbnail image desired to be displayed does not lie in either of the 3D image file and thumbnail image file, one of the plural thumbnail images (for example, the first thumbnail image) may be displayed.

Alternatively, when a thumbnail image desired to be displayed does not lie in either of the 3D image file and thumbnail image file, the thumbnail image desired to be displayed may be produced and displayed based on the 3D image. Further, the thumbnail image thus produced may be added to the thumbnail image file and at the same time the management information may be updated.

Another Embodiment of 3D Image File

According to the aforementioned embodiment, a 3D image file and thumbnail image file are separately produced and recorded in a manner associated with each other. However, according to another embodiment of 3D image file, plural types of thumbnail images are recorded on a 3D image file without producing a thumbnail image file.

Each of FIGS. 13A, 13B and 13C is a view illustrating a file structure according to another embodiment of 3D image file.

The first file structure of 3D image file illustrated in FIG. 13A is obtained by replacing the area for thumbnail image and management information illustrated in FIG. 5C with that for the first to the k-th thumbnail images of FIG. 7.

There can be a case where compatibility can be ensured by using the first file structure described above. However, if it is limited to a case where the structure is applied to the existing Exif (Exchange Image File Format) standard, actually the size limit of Exif standard may be infringed depending on the total value of thumbnail image size, so that compatibility cannot be ensured.

The second file structure of 3D image file illustrated in FIG. 13B can solve the above problem of the first file structure; the structure is obtained by storing only the first thumbnail image in the area of thumbnail image and management information of FIG. 5C and arranging, subsequent to the 3D image (original image), the thumbnail management information and the second to the k-th thumbnail images.

The 3D image in the first or second file structure may be an integrated image as illustrated in FIG. 5A or an image obtained by separating and combining images corresponding to each viewpoint illustrated in FIG. 5B.

The third file structure of 3D image file illustrated in FIG. 13C is applied only to a case where images corresponding to each viewpoint are separately arranged as the 3D image; the header, the first thumbnail image and the 3D image corresponding to the first viewpoint are recorded in an Exif-compliant format, and subsequent to these, thumbnail management information, the second to the k-th thumbnails and the 3D images corresponding to the second to the k-th viewpoints are arranged.

In the image file production devices which produce the 3D image files illustrated in FIGS. 13A 13B and 13C, the thumbnail image file production unit 140 in the image file production device 100 illustrated in FIG. 2 is not needed, and plural types of thumbnail images produced by the thumbnail image production unit 120 and tag data produced by the tag data production unit 130 are all output to the 3D image file production unit 150 to produce the 3D image files illustrated in FIGS. 13A, 13B and 13C.

Further, in the image file production device which reproduces the 3D image file illustrated in FIG. 13, the thumbnail image read unit 320 in the image reproduction device 300 illustrated in FIG. 9 is not needed.

In the above description of the present embodiment, the image file production device and image reproduction device are incorporated in the digital camera. However, the image file production device and image reproduction device may be each a separate device.

What is claimed is:

1. An image reproduction device comprises:
    a thumbnail image read device which reads a thumbnail image file having recorded thereon two or more types of thumbnail images produced based on a stereo image composed of a plurality of images obtained by capturing the same subject from a plurality of viewpoints, the thumbnail image file having management information including a thumbnail image identifier for identifying the type of each thumbnail image;
    a thumbnail image selection device which selects one thumbnail image to be used for displaying, and which corresponds to a preliminarily set thumbnail image identifier, from among the plurality of thumbnail images recorded on the read thumbnail image file, based on the management information; and
    a thumbnail image reproduction device which causes the selected thumbnail image to be displayed on a display device,
    wherein the thumbnail image selection device selects one thumbnail image from among the plurality of thumbnail images when a thumbnail image corresponding to the preliminarily set thumbnail image identifier does not exist in the plurality of thumbnail images recorded in the read thumbnail image file.

2. The image reproduction device according to claim 1, further comprising:
    a stereo image read device which reads a stereo image file having recorded thereon the stereo image and associated with the thumbnail image file,
    wherein when a thumbnail image is contained in the stereo image file associated with the thumbnail image file, the thumbnail image read device also reads the thumbnail image.

3. The image reproduction device according to claim 2, further comprising:
    an instruction device which gives an instruction of reproducing a stereo image corresponding to the thumbnail image displayed on the display device; and
    a stereo image display device which reads in response to the instruction from the instruction device, the stereo image instructed to be reproduced from the stereo image file and causes the stereo image to be displayed on the display device.

4. An image reproduction device comprises:
    a thumbnail image read device which reads a thumbnail image file having recorded thereon one or more types of thumbnail images produced based on a stereo image composed of a plurality of images obtained by capturing the same subject from a plurality of viewpoints, the thumbnail image file being recorded with a thumbnail image having first management information including a thumbnail image identifier which identifies the type of each thumbnail image;
    a stereo image read device which reads a stereo image file associated with the thumbnail image file and having recorded thereon along with the stereo image, one thumbnail image of a type different from the thumbnail image recorded on the thumbnail image file, the one thumbnail image of a different type having second management information including a thumbnail image identifier which identifies the type of thumbnail image;
    a thumbnail image selection device which selects one thumbnail image to be used for displaying and corresponding to a preliminarily set thumbnail image identifier from among the plurality of thumbnail images recorded on the read thumbnail image file and the stereo image file based on the first management information and the second management information; and
    a thumbnail image reproduction device which causes the selected thumbnail image to be displayed on a display device,
    wherein the thumbnail image selection device selects one thumbnail image from among the plurality of thumbnail images, when a thumbnail image corresponding to the preliminarily set thumbnail image identifier does not exist in the plurality of thumbnail images recorded in the read thumbnail image file.

5. The image reproduction device according to claim 4, further comprising:
    an instruction device which gives an instruction of reproducing a stereo image corresponding to the thumbnail image displayed on the display device; and
    a stereo image display device which reads in response to the instruction from the instruction device, the stereo image instructed to be reproduced from the stereo image file and causes the stereo image to be displayed on the display device.

6. An image reproduction device comprising:
    an image read device which reads a stereo image file having recorded thereon a stereo image composed of a plurality of images obtained by capturing the same subject from a plurality of viewpoints, and two or more types of thumbnail images produced based on the stereo image, the thumbnail image file having management information including a thumbnail image identifier for identifying the type of each thumbnail image;
    a thumbnail image selection device which selects one thumbnail image to be used for displaying and corresponding to a preliminarily set thumbnail image identifier from among the plurality of thumbnail images recorded on the read stereo image file; and a thumbnail image reproduction device which causes the selected thumbnail image to be displayed on a display device wherein the thumbnail image selection device selects one thumbnail image from among the plurality of thumbnail images, when a thumbnail image corresponding to the preliminarily set thumbnail image identifier does not exist in the plurality of thumbnail images recorded in the read stereo image file.

7. The image reproduction device according to claim 6, further comprising:

an instruction device which gives an instruction of reproducing a stereo image corresponding to the thumbnail image displayed on the display device; and a stereo image display device which reads in response to the instruction from the instruction device, the stereo image instructed to be reproduced from the stereo image file and causes the stereo image to be displayed on the display device.

8. An image reproduction method comprising the steps of:

reading a thumbnail image file having recorded thereon combining two or more types of thumbnail images produced based on a stereo image composed of a plurality of images obtained by capturing the same subject from a plurality of viewpoints, the thumbnail image file having management information including a thumbnail image identifier which identifies the type of each thumbnail image;

selecting one thumbnail image to be used for displaying and corresponding to a preliminarily set thumbnail image identifier from among the plurality of thumbnail images recorded on the read thumbnail image file, said selecting being based on the management information; and causing the selected thumbnail image to be displayed on a display device, wherein the step of selecting selects the one thumbnail image, when a thumbnail image corresponding to the preliminarily set thumbnail image identifier does not exist in the plurality of thumbnail images recorded in the read thumbnail image file.

9. The image reproduction method according to claim 8, further comprising the step of:

reading a stereo image file having recorded thereon the stereo image and associated with the thumbnail image file, wherein the thumbnail image selection step selects one thumbnail image to be used for displaying from among the plurality of thumbnail images recorded on the read thumbnail image file and the stereo image file.

10. An image reproduction method comprising the steps of:

reading a thumbnail image file having recorded thereon one or more types of thumbnail images produced based on a stereo image composed of a plurality of images obtained by capturing the same subject from a plurality of viewpoints, the thumbnail image file also being recorded with a thumbnail image having first management information including a thumbnail image identifier which identifies the type of each thumbnail image;

reading a stereo image file associated with the thumbnail image file and having recorded thereon along with the stereo image, one thumbnail image of a type different from the thumbnail images recorded on the thumbnail image file, the stereo image file having second management information including a thumbnail image identifier which identifies the type of thumbnail image;

selecting one thumbnail image to be used for displaying and corresponding to a preliminarily set thumbnail image identifier from among the plurality of thumbnail images recorded on the read thumbnail image file and the stereo image file, based on the first management infoimation and the second management information; and causing the selected thumbnail image to be displayed on a display device, wherein the step of selecting selects the one thumbnail image when a thumbnail image corresponding to the preliminarily set thumbnail image identifier does not exist in the plurality of thumbnail images recorded in the read thumbnail image file.

11. An image reproduction method comprising the steps of:

reading a stereo image file having recorded thereon a stereo image composed of a plurality of images obtained by capturing the same subject from a plurality of viewpoints, and two or more types of thumbnail images produced based on the stereo image, the stereo image file having management information including a thumbnail image identifier which identifies the type of each thumbnail image;

selecting one thumbnail image to be used for displaying and corresponding to a preliminarily set thumbnail image identifier from among the plurality of thumbnail images recorded on the read stereo image file, based on the management information; and causing the selected thumbnail image to be displayed on a display device, wherein the step of selecting selects the one thumbnail image when a thumbnail image corresponding to the preliminarily set thumbnail image identifier does not exist in the plurality of thumbnail images recorded in the read stereo image file.

12. An image reproduction device comprising:

a thumbnail image read device which reads a thumbnail image file having recorded thereon two or more types of thumbnail images produced based on a stereo image composed of a plurality of images obtained by capturing the same subject from a plurality of viewpoints, the thumbnail image file having management information including a thumbnail image identifier for identifying the type of each thumbnail image;

a thumbnail image selection device which selects one thumbnail image to be used for displaying, and which corresponds to a preliminarily set thumbnail image identifier, from among the plurality of thumbnail images recorded on the read thumbnail image file, based on the management information;

a thumbnail image reproduction device which causes the selected thumbnail image to be displayed on a display device; and a thumbnail image production device which produces a thumbnail image corresponding to the preliminarily set thumbnail image identifier when a thumbnail image corresponding to the preliminarily set thumbnail image identifier does not exist in the plurality of thumbnail images recorded in the read thumbnail image file, based on the stereo image.

13. the image reproduction device according to claim 12, further comprising:

a stereo image read device which reads a stereo image file having recorded thereon the stereo image and associated with thumbnail image file, wherein when a thumb nail image is contained in the stereo image file associated with the thumbnail image file, the thumbnail image read device also reads a thumbnail image.

14. The image reproduction device according to claim 13, further comprising:
an instruction device which gives an instruction of reproducing a stereo image corresponding to the thumbnail image displayed on the display device; and
a stereo image display device which reads in response to inputting of the instruction from the instruction device, the stereo image instructed to be reproduced from the stereo image file and causes the stereo image to be displayed on the display device.

15. An image reproduction device comprising:
a thumbnail image read device which reads a thumbnail image file having recorded thereon one or more types of thumbnail images produced based on a stereo image composed of a plurality of images obtained by capturing the same subject from a plurality of viewpoints, and which thumbnail image file is recorded with a thumbnail image having first management information including a thumbnail image identifier which identifies the type of each thumbnail image;
a stereo image read device which reads a stereo image file associated with the thumbnail image file and having recorded thereon along with the stereo image, one thumbnail image of a type different from the thumbnail image recorded on the thumbnail image file, the one thumbnail image of a different type having second management information including a thumbnail image identifier which identifies the type of thumbnail image;
a thumbnail image selection device which selects one thumbnail image to be used for displaying and corresponding to a preliminarily set thumbnail image identifier from among the plurality of thumbnail images recorded on the read thumbnail image file and the stereo image file based on the first management information and the second management information; and
a thumbnail image reproduction device which causes the selected thumbnail image to be displayed on a display device; and
a thumbnail image production device which produces a thumbnail image corresponding to the preliminarily set thumbnail image identifier when a thumbnail image corresponding to the preliminarily set thumbnail image identifier does not exist in the plurality of thumbnail images recorded in the read thumbnail image file, based on the stereo image recorded on the stereo image file.

16. The image reproduction device according to claim 15, further comprising:
an instruction device which gives an instruction of reproducing a stereo image corresponding to the thumbnail image displayed on the display device; and
a stereo image display device which reads in response to inputting of the instruction from the instruction device, the stereo image instructed to be reproduced from the stereo image file and causes the stereo image to be displayed on the display device.

17. An image reproduction device comprising:
an image read device which reads a stereo image file having recorded thereon a stereo image composed of a plurality of images obtained by capturing the same subject from a plurality of viewpoints, and two or more types of thumbnail images produced based on the stereo image, the stereo image file having management information including a thumbnail image identifier for identifying the type of each thumbnail image;
a thumbnail image selection device which selects one thumbnail image to be used for displaying and corresponding to a preliminarily set thumbnail image identifier from among the plurality of thumbnail images recorded on the read stereo image file, based on the management information;
a thumbnail image reproduction device which causes the selected thumbnail image to be displayed on a display device; and
a thumbnail image production device which produces a thumbnail image corresponding to the preliminarily set thumbnail image identifier when a thumbnail image corresponding to the preliminarily set thumbnail image identifier does not exist in the plurality of thumbnail images recorded in the read thumbnail image file, based on the stereo image recorded in the stereo image file.

18. The image reproduction device according to claim 17, further comprising:
an instruction device which gives an instruction of reproducing a stereo image corresponding to the thumbnail image displayed on the display device; and
a stereo image display device which reads in response to the instruction from the instruction device, the stereo image instructed to be reproduced from the stereo image file and causes the stereo image to be displayed on the display device.

19. An image reproduction method comprising the steps of:
reading a thumbnail image file having recorded thereon combining two or more types of thumbnail images produced based on a stereo image composed of a plurality of images obtained by capturing the same subject from a plurality of viewpoints, and having management information including a thumbnail image identifier which identifies the type of each thumbnail image;
selecting one thumbnail image to be used for displaying and corresponding to a preliminarily set thumbnail image identifier from among the plurality of thumbnail images recorded on the read thumbnail image file, said selecting being based on the management information;
causing the selected thumbnail image to be displayed on a display device; and
producing a thumbnail image corresponding to the preliminarily set thumbnail image identifier when a thumbnail image corresponding to the preliminarily set thumbnail image identifier does not exist in the plurality of thumbnail images recorded in the read thumbnail image file, based on the stereo image.

20. The image reproduction method according to claim 19, further comprising the step of:
reading a stereo image file having recorded thereon the stereo image and associated with the thumbnail image file,
wherein the thumbnail image selection step selects one thumbnail image to be used for displaying from among the plurality of thumbnail images recorded on the read thumbnail image file and the stereo image file.

21. An image reproduction method comprising the steps of:
reading a thumbnail image file having recorded thereon one or more types of thumbnail images produced based on a stereo image composed of a plurality of images obtained by capturing the same subject from a plurality of viewpoints, and which is recorded with a thumbnail image having first management information including a thumbnail image identifier which identifies the type of each thumbnail image;

reading a stereo image file associated with the thumbnail image file and having recorded thereon along with the stereo image, one thumbnail image of a type different from the thumbnail images recorded on the thumbnail image file, the stereo image file having second management information including a thumbnail image identifier which identifies the type of thumbnail image;

selecting one thumbnail image to be used for displaying and corresponding to a preliminarily set thumbnail image identifier from among the plurality of thumbnail images recorded on the read thumbnail image file and the stereo image file, based on the first management information and the second management information;

causing the selected thumbnail image to be displayed on a display device; and producing a thumbnail image of the preliminarily set thumbnail image identifier when a thumbnail image corresponding to the preliminarily set thumbnail image identifier does not exist in a plurality of thumbnail images recorded in the read thumbnail image file, based on the stereo image recorded in the stereo image file.

22. An image reproduction method comprising the steps of:

reading a stereo image file having recorded thereon a stereo image composed of a plurality of images obtained by capturing the same subject from a plurality of viewpoints, and two or more types of thumbnail images produced based on the stereo image, the stereo image file having management information including a thumbnail image identifier which identifies the type of each thumbnail image;

selecting one thumbnail image to be used for displaying and corresponding to a preliminarily set thumbnail image identifier from among the plurality of thumbnail images recorded on the read stereo image file, based on the management information;

causing the selected thumbnail image to be displayed on a display device; and producing a thumbnail image of the preliminarily set thumbnail image identifier when a thumbnail image corresponding to the preliminarily set thumbnail image identifier does not exist in a plurality of thumbnail images recorded in the read thumbnail image file, based on the stereo image recorded in the stereo image file.

* * * * *